Sept. 21, 1948.  G. A. R. FOSTER ET AL  2,449,742
METHOD AND APPARATUS FOR DOFFING
SPINNING FRAMES AND THE LIKE
Filed Nov. 27, 1945  13 Sheets-Sheet 1

Inventors:
GEORGE A.R. FOSTER AND JAMES GREGORY.
By: Francis E. Boyce
ATTORNEY.

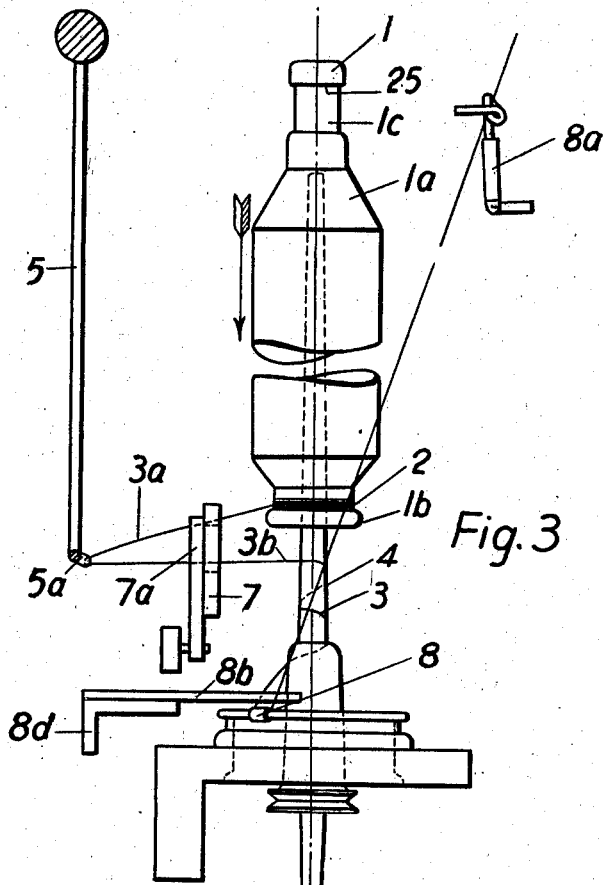
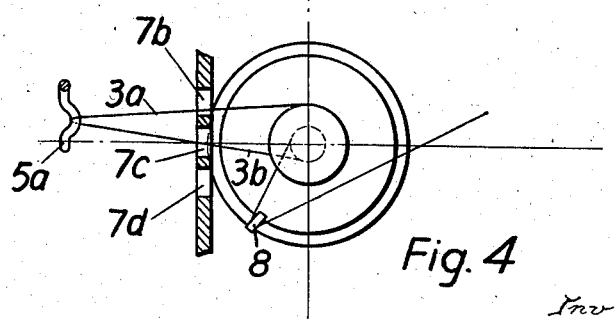

Sept. 21, 1948.    G. A. R. FOSTER ET AL    2,449,742
METHOD AND APPARATUS FOR DOFFING
SPINNING FRAMES AND THE LIKE
Filed Nov. 27, 1945    13 Sheets-Sheet 4
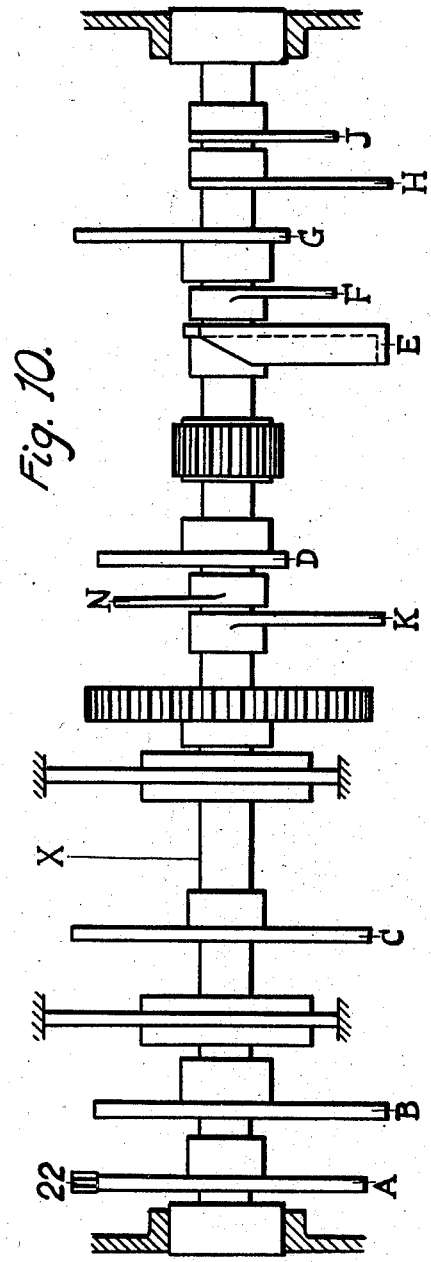
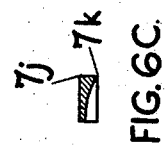
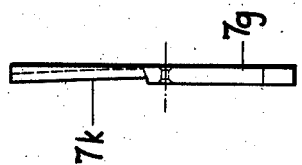
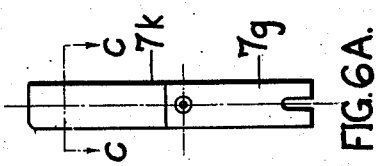
Inventors.
GEORGE A. R. FOSTER and JAMES GREGORY.
By: Francis B. Boyce
ATTORNEY.

Sept. 21, 1948. G. A. R. FOSTER ET AL 2,449,742
METHOD AND APPARATUS FOR DOFFING
SPINNING FRAMES AND THE LIKE
Filed Nov. 27, 1945 13 Sheets-Sheet 5

Inventors.
GEORGE A. R. FOSTER AND JAMES GREGORY.
By Francis E. Boyce
ATTORNEY.

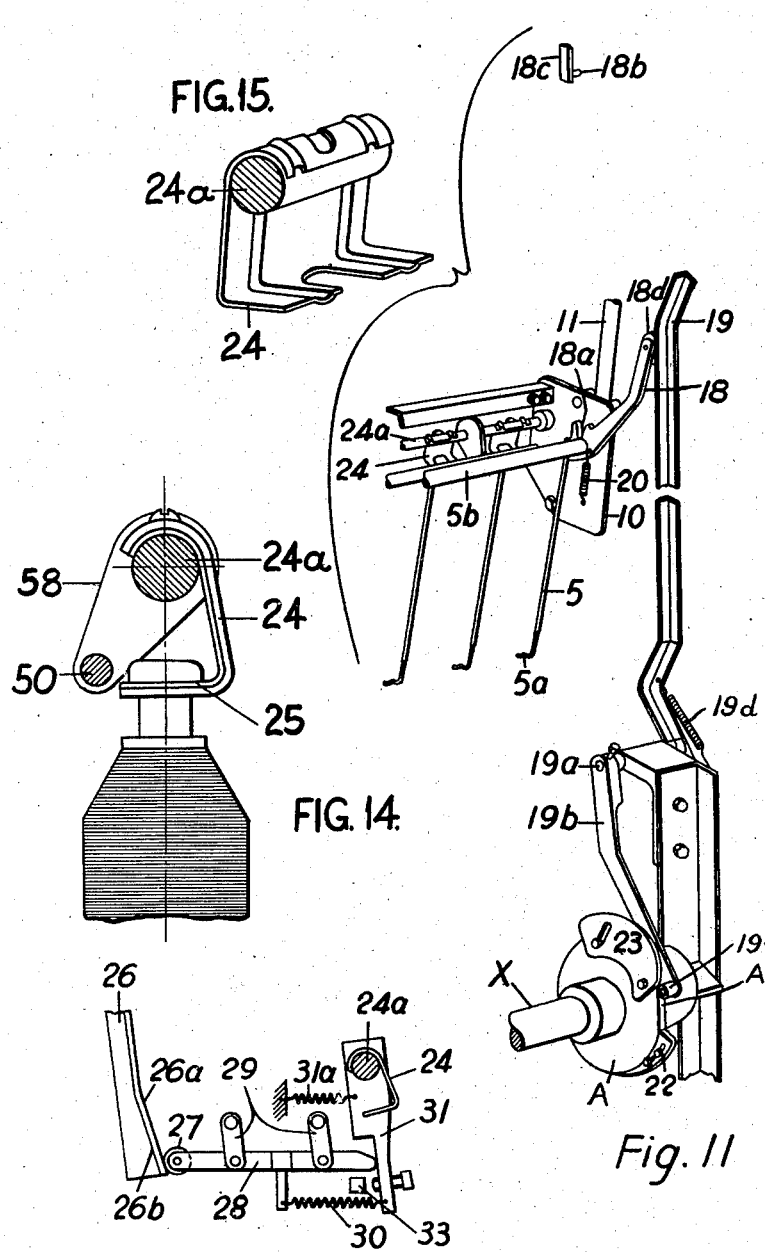

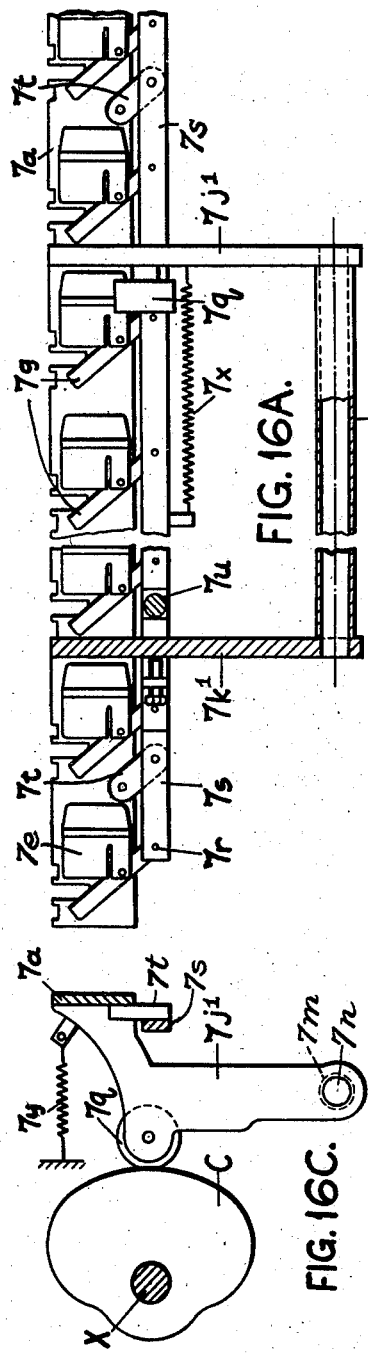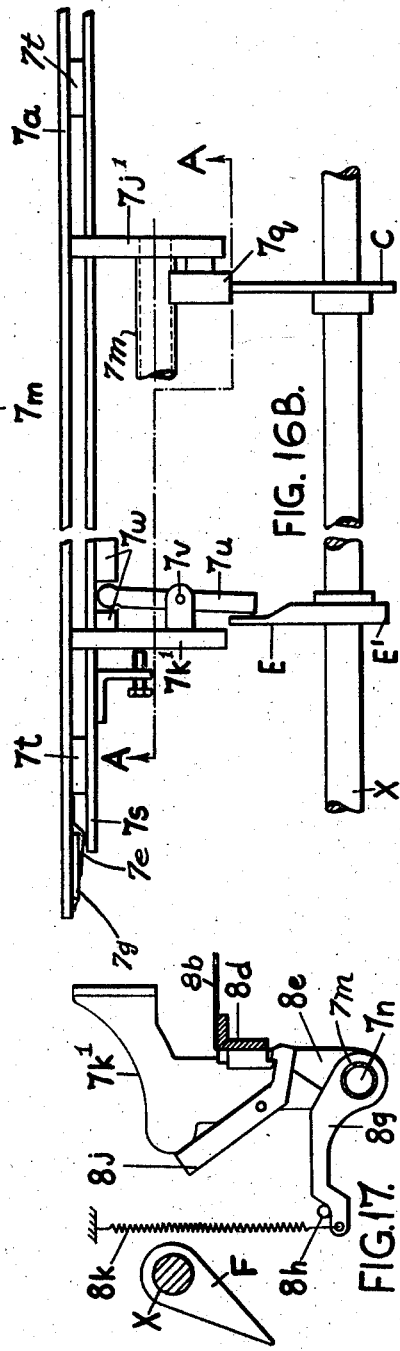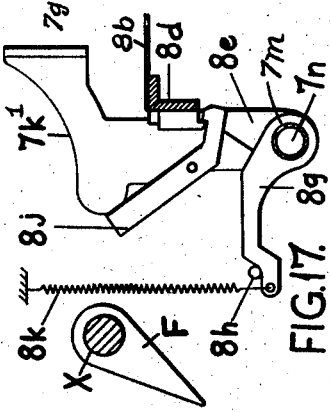

Sept. 21, 1948.　　　　G. A. R. FOSTER ET AL　　　　2,449,742
METHOD AND APPARATUS FOR DOFFING
SPINNING FRAMES AND THE LIKE
Filed Nov. 27, 1945　　　　　　　　　　　13 Sheets-Sheet 10
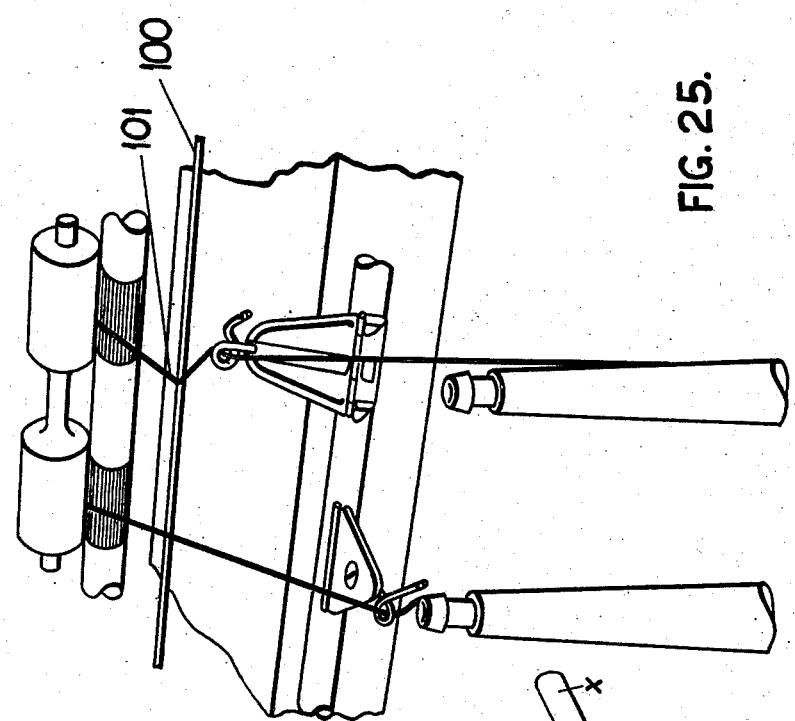
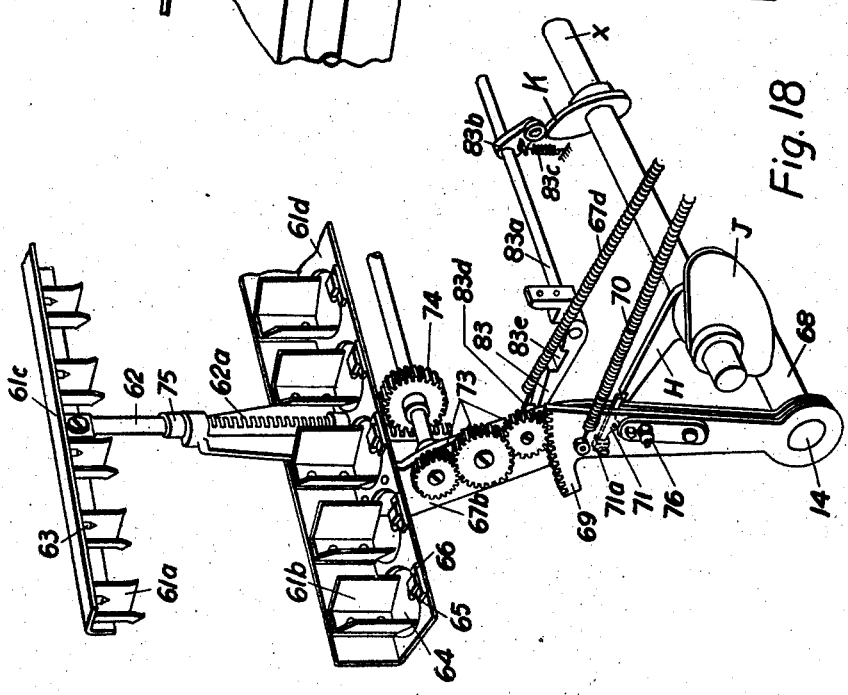
Inventors.
GEORGE A. R. FOSTER and JAMES GREGORY.
By: Francis E. Boyce
ATTORNEY.

Sept. 21, 1948.                G. A. R. FOSTER ET AL                2,449,742
                         METHOD AND APPARATUS FOR DOFFING
                            SPINNING FRAMES AND THE LIKE
Filed Nov. 27, 1945                                         13 Sheets-Sheet 11
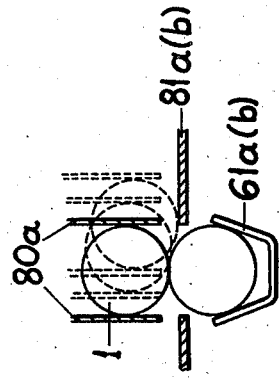
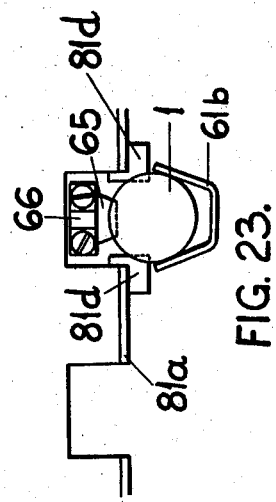
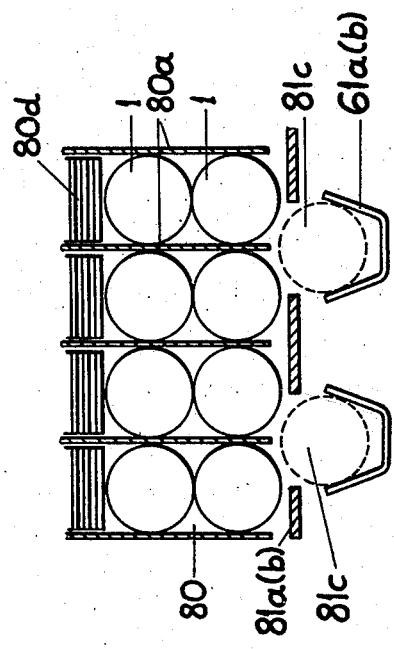
Inventors.
GEORGE A. R. FOSTER and JAMES GREGORY.
By: Francis E. Boyce
ATTORNEY.

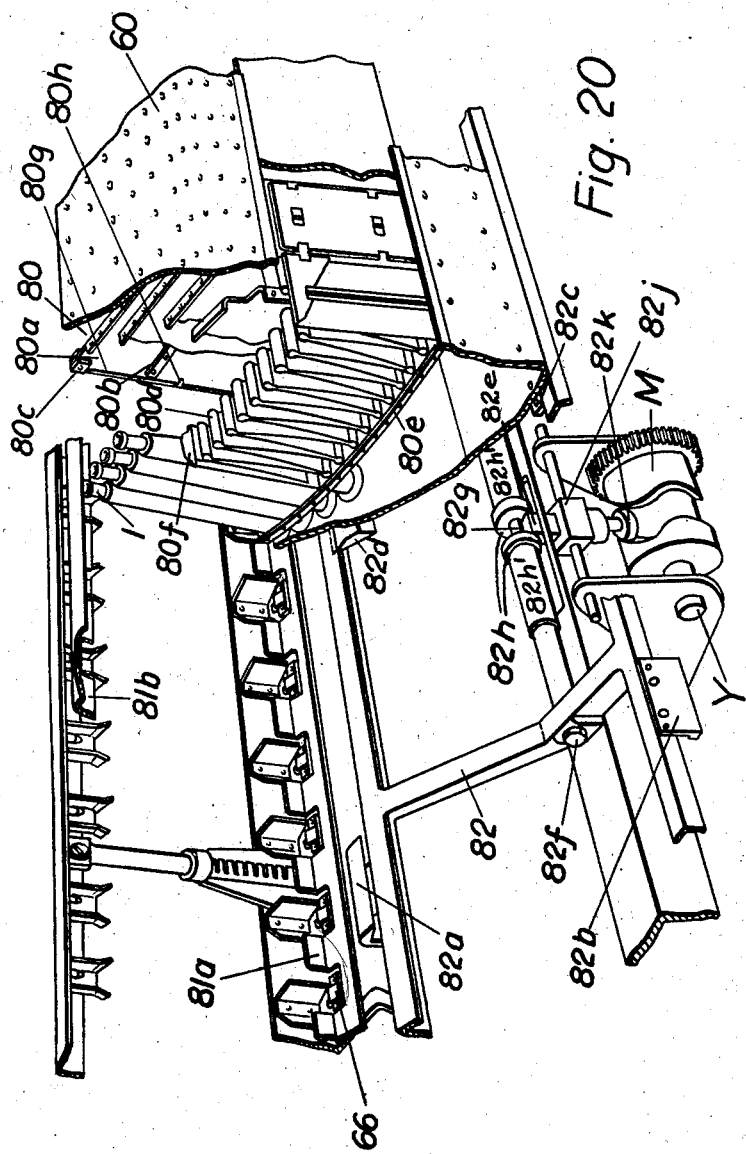

Patented Sept. 21, 1948

2,449,742

UNITED STATES PATENT OFFICE 2,449,742

METHOD AND APPARATUS FOR DOFFING SPINNING FRAMES AND THE LIKE

George Alfred Rea Foster and James Gregory, Didsbury, Manchester, England, assignors to The British Cotton Industry Research Association, Didsbury, Manchester, England, a British association Application November 27, 1945, Serial No. 631,114
In Great Britain November 30, 1944

15 Claims. (Cl. 57—53)

Our invention relates to doffing apparatus for ring spinning, doubling and twisting frames, and embraces the complete method for replacing full bobbins or tubes (hereinafter referred to as bobbins) on the frame spindles by empty bobbins, meanwhile controlling and securing the threads so as to avoid the rupture of the threads between the spindles and the rollers and in some cases to avoid the accumulation of waste yarn on the spindles; and in addition supplying empty bobbins from a container and removing full bobbins to another container. The term "doffing" is used herein in its accepted sense to include removal of the full bobbin and fitting of an empty one.

The invention comprises the method of doffing for ring spinning, doubling and twisting frames wherein the bobbin is raised on the spindle so as to cause thread to wind off the bobbin onto the spindle and including the step wherein such winding is controlled and such portion of the thread mechanically manipulated during removal of the full bobbin and fitting of an empty one.

The method aforesaid may include the several steps of (a) lifting the bobbin so as to cause the yarn thereon to unwind over the lower end of the bobbin on to the spindle (b) catching or picking up the yarn below the bobbin as it so unwinds (c) gripping and severing the yarn below the bobbin so as to hold the end leading to the spindle and thence to the traveller and release the end leading to the bobbin, (d) removing the full bobbin and (e) fitting an empty bobbin on to the spindle so as to trap the yarn wound thereon, whilst releasing the held end, the yarn being then intact so that spinning or doubling can be resumed.

The method aforesaid may also include the further step (f) of immobilising the yarn leading to the traveller from the source of supply preceding the initial step (a) of lifting the bobbin and so as to preclude movement within a certain arc of the ring, and may be characterised in that the step of lifting the bobbins includes high initial mechanical advantage for loosening the bobbin on the spindle.

According to the invention doffing apparatus for ring spinning, doubling and twisting frames comprises means for preventing the traveller from passing in front of the spindle during doffing, means for gripping, loosening and raising the full bobbin on its spindle so as to cause a short length of the yarn to wind around the bare spindle, means for catching the yarn as it so winds off the base of each bobbin and after it has so wound on its spindle, means for severing the yarn between the base of the bobbin and its spindle so as to hold the end leading to the spindle for trapping by a new bobbin and so as to release the end leading to the bobbin.

The improved apparatus also preferably embodies means for disposing of full bobbins into a container and means for supplying empty bobbins from a container and placing them on the spindles.

It must be understood that before commencing to doff we follow the usual practice of lowering the ring rail and spinning a few turns, or so called "doffing coils," on the bottom of the bobbin. Alternatively, the doffing coils could be wound on to the bare spindle below the bobbin, but in this case the doffing coils would accumulate as waste on the spindles.

As regards the actual removal of the full bobbins from their spindles, one difficulty has been the relatively large force required to loosen a bobbin on the spindle, the consequence of which is that a relatively large external force is required to loosen the bobbins, and this necessitates an inconveniently robust form of mechanism. In some known methods this difficulty is surmounted by doffing small groups of bobbins or even single bobbins at one operation, by a mechanism which traverses the frame from one end to the other. According to one feature of this invention, however, it is possible to doff simultaneously any desired number of bobbins on the frame by performing the loosening operation by means of a mechanism which acts at such a mechanical advantage that a relatively small total external force is required, after which the raising of the loosened bobbins is an easy matter.

In carrying out our method we prefer to arrange so that the same external means which produce the loosening of the bobbin subsequently act so as to raise the bobbin.

The accompanying drawings illustrate one example of the invention in which:

Figs. 3 and 4 are elevation and plan correspondingg to Figs. 1 and 2 respectively and illustrating a later stage after picking up the thread.

Figs. 6A, 6B and 6C are front elevation, side view and sectional plan on line C—C of Fig. 6A respectively of the pivoted cutter blade.

Fig. 10 is a front elevation of the camshaft.

Fig. 11 is a perspective view of the operating mechanism for the thread hooks.

Fig. 12 is an end view of the operating mechanism for the bobbin lifters.

Figs. 14 and 15 are end and perspective views of the bobbin lifters.

Figs. 16A, 16B and 16C are respectively front elevation on line "AA" of Fig. 16B, plan and end elevation of the operating mechanism for the cutter shown in Figs. 5A and 5B.

Fig. 17 is a detail view of the mechanism for operating the thread immobiliser.

Fig. 18 is a perspective view showing the mechanism for projecting empty bobbins on to the spindles.

Fig. 19 is a sectional elevation from the opposite direction of some of the parts shown in Fig. 18.

Fig. 20 is a fragmentary view of the empty bobbin magazine and the mechanism for filling the empty bobbin projector.

Fig. 21 is a sectional plan showing the principle of the feeding of the bobbins to the empty bobbin projector from the magazine.

Fig. 22 is a sectional plan illustrating the bobbin motion during the return movement of the magazine after filling the empty bobbin projector.

Fig. 23 is a detail plan of the lower shutter, which retains the empty bobbins in the magazine.

Fig. 24A is a sectional elevation on line "AA" Fig. 24.

Fig. 25 is a perspective view of the thread tensioning device.

Figures 1, 2:
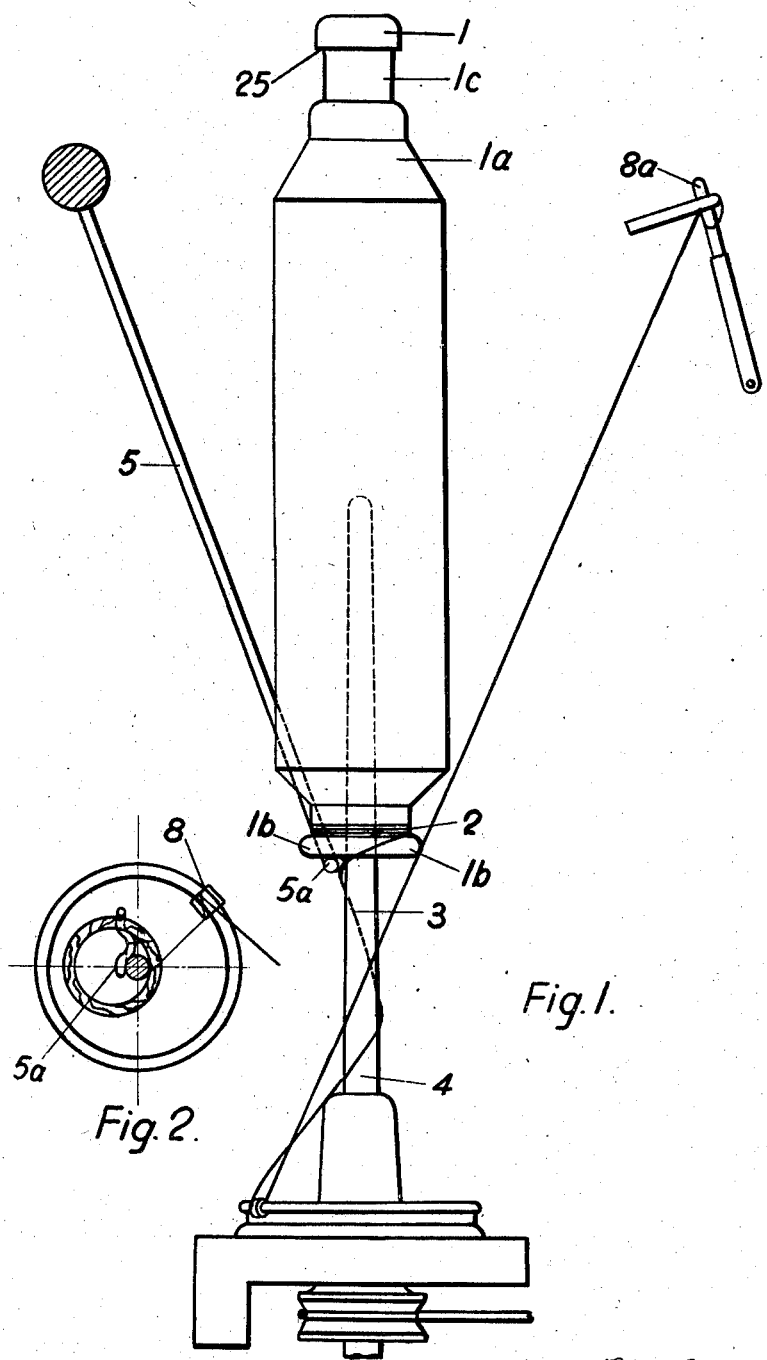
Fig. 1 is a side elevation of a single spindle with the bobbin in an initial raised position during an early stage of the doffing operation.
Fig. 2 is a sectional plan showing the means for picking up the thread.

In Figs. 1 to 6C are illustrated the processes comprised in the invention, deferring, however, a consideration of the means to be adopted for producing the motions of the various members concerned. Fig. 1 shows in end elevation a single spindle on a ring frame, after the bobbin has been loosened on the spindle and raised so that a short length of yarn is dragged from the base of the bobbin on to the bare spindle. Fig. 2 shows in plan the disposition of the end of the hook relative to the spindle and base of the bobbin. Figs. 3 and 4 correspond to Figs. 1 and 2 respectively, and illustrate a later stage in the process of thread control. Fig. 5A shows in front elevation the thread-cutting means at the stage of the process indicated in Fig. 4; and Fig. 5B is a plan view corresponding to Fig. 5A.

After the bobbins 1 have been filled with yarn 1a and a few turns 2 wound on the bottom of the bobbin and after the usual thread guides 8a have been lifted by hand so as to clear the doffing mechanism, each bobbin and its thread are operated on in the following manner. The bobbin is gripped, loosened on its spindle 4 and raised a short distance so that a length 3 of yarn is pulled off it and wound round the bar spindle 4. Immediately preceding such raising of the bobbin, a traveller drag 8b described later in detail, is brought into position to prevent the travellers from passing in front of the spindles during doffing. A hook 5 is then brought into position so that its end 5a lies just under the bobbin and close to the spindle. The bobbin and hook are then raised together, more yarn being thus unwound from the bobbin to engage the hook after which the yarn unwinds by causing the bobbin to rotate. The distance raised is adjusted in amount so as to ensure that each thread uncoils from its bobbin enough to be caught by the hook-end. (The direction of the bend forming the hook-end must, of course, be adapted to the direction of the twist. The direction shown in the figures is for the so-called Z twist). The bobbin and hook are then lowered, the hook being manipulated so that the hook-end swings away from the spindle (see Fig. 3) so as to maintain the yarn in a state of tension, taking up the slack which would otherwise be produced by the lowering of the bobbin.

This motion of the hook-end disposes the yarn which lies between the bobbin and the bare spindle in two portions; a portion 3a passing from the bobbin to the hook-end and a portion 3b passing from the hook-end to the bare spindle. The motions of the bobbin and the hook are such as to place these portions in appropriate positions for the action of the cutter 7. This cutter consists of a metal plate 7a with equipment for severing and holding each thread. This equipment comprises slots 7b and 7c, the motion of the hook being such as to place the portion 3a of the thread in the slot 7b and the portion 3b in the slot 7c. The slot 7d is for use with the other hand of twist. The curvature of the hook-end shown in Figs. 2 and 4 helps in the precise location of the portions of thread relative to the cutters. For the other hand of twist a slight lateral displacement of the cutters is required.

The means for cutting the thread are such as to release the portion of thread passing to the bobbin, while retaining, till a later stage in the process of thread control, the portion passing to the bare spindle. As will be appreciated after full comprehension of the example of the invention described below such severing of the thread is effected so that this portion passing to the spindle is as short as possible. At the next doffing operation, this portion forms a trailing end which may be trapped by the new doffing coils as they unwind onto the spindle with the lifting of the bobbin but if kept short this portion will generally lift clear with the bobbin and avoid accumulation of waste thread on the spindle. The means for cutting the thread are attached to the plate 7a and for each spindle comprise a fixed thin spring plate 7e with cutting edge 7f, and a rotatable rigid blade 7g pivoted at 7h and shaped in cross section so as to provide a blunt edge 7j engaging the edge of one side of the indentation 7c and a sharp edge 7k engaging the edge 7f. When the blade 7g is rotated through a small angle (clockwise in Fig. 5A) the blunt edge 7j (Fig. 6C) traps and holds the thread 3b against the plate 7a and after this the sharp edge 7k severs the thread against the complementary sharp edge 7f. In this way the length of yarn 3b between the hook 5a and the bare spindle is severed, the portion of the yarn trailing from the bobbin being released, while the portion passing to the bare spindle and thence to the traveller 8 and through the lappet or thread guide 8a to the front rollers of the frame (not shown) is temporarily held.

The bobbins are then raised sufficiently far above the spindles to allow empty bobbins to be brought into position over the spindles, and these are then projected onto the spindles, the thread passing round the bare spindle being thus trapped between the base of the spindle and the surface of the internal bore of the bobbin. The full bobbins are released and projected into a container, and the process is then complete for the spindles operated upon. The bobbins shown are of special shape having flanged bases 1b to ensure that the thread unwinds from the base of the bobbin instead of slipping off during the process of thread control after the hook-end 5a has engaged the thread, and having a neck 1c at the upper end, providing a shoulder 25 for the purpose described later, such neck being of sufficient length to enable the lifters 24 to engage bobbins resting at varying heights on their spindles.

In certain frames the raising of the lappets or thread guides causes an undue slackening of the thread. In such cases means are provided to obviate this such as a rod 100 (see Fig. 25) running lengthways of the frame operated upon, and so located that when the lappets or thread guides 8a are in their raised position there is a compensating deflection 101 of the thread.

Figure 8:
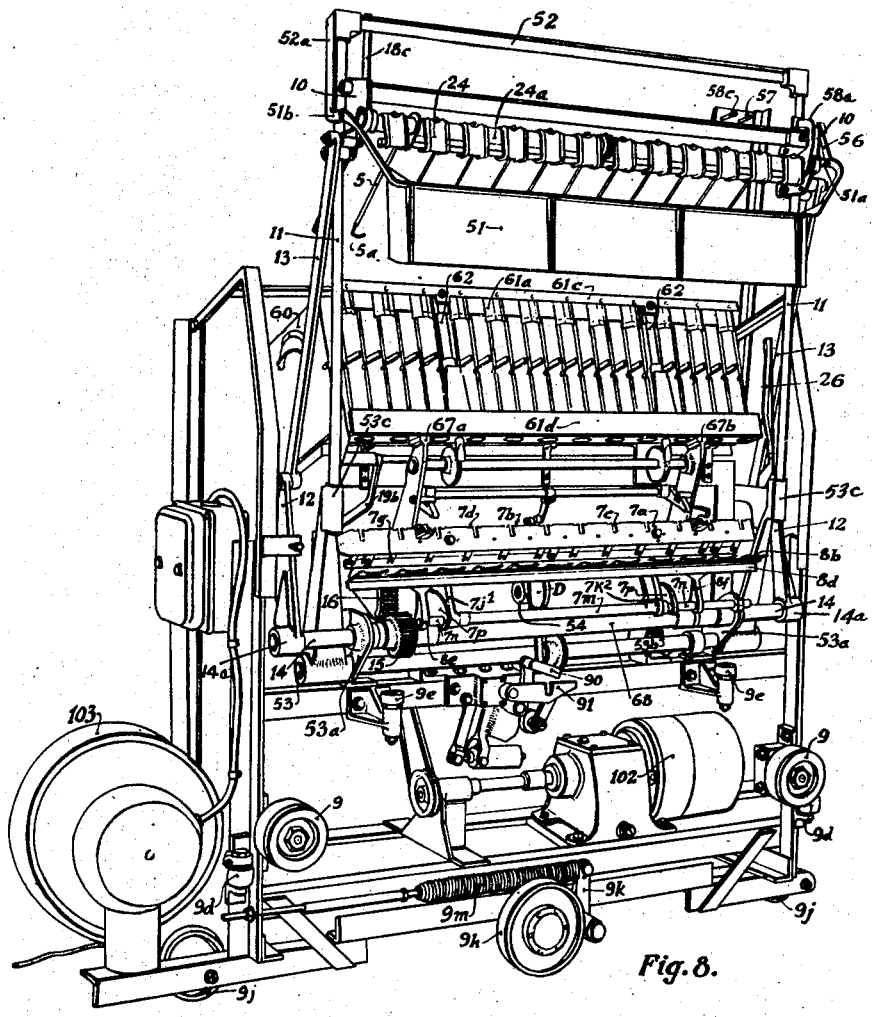
Fig. 8 is a general arrangement in perspective of the carriage doffer.
Figure 9:
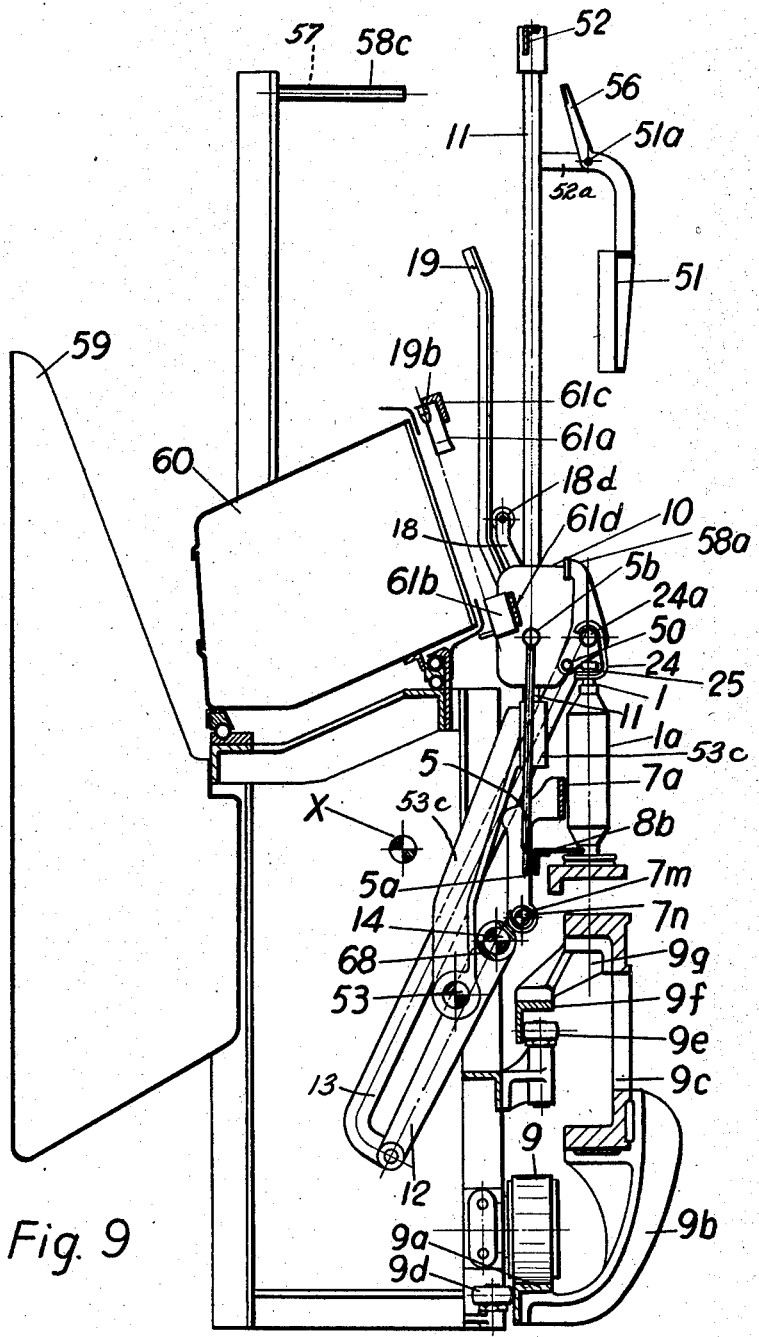
Fig. 9 is a sectional end elevation of the carriage doffer with part of the frame removed.
Figure 13:
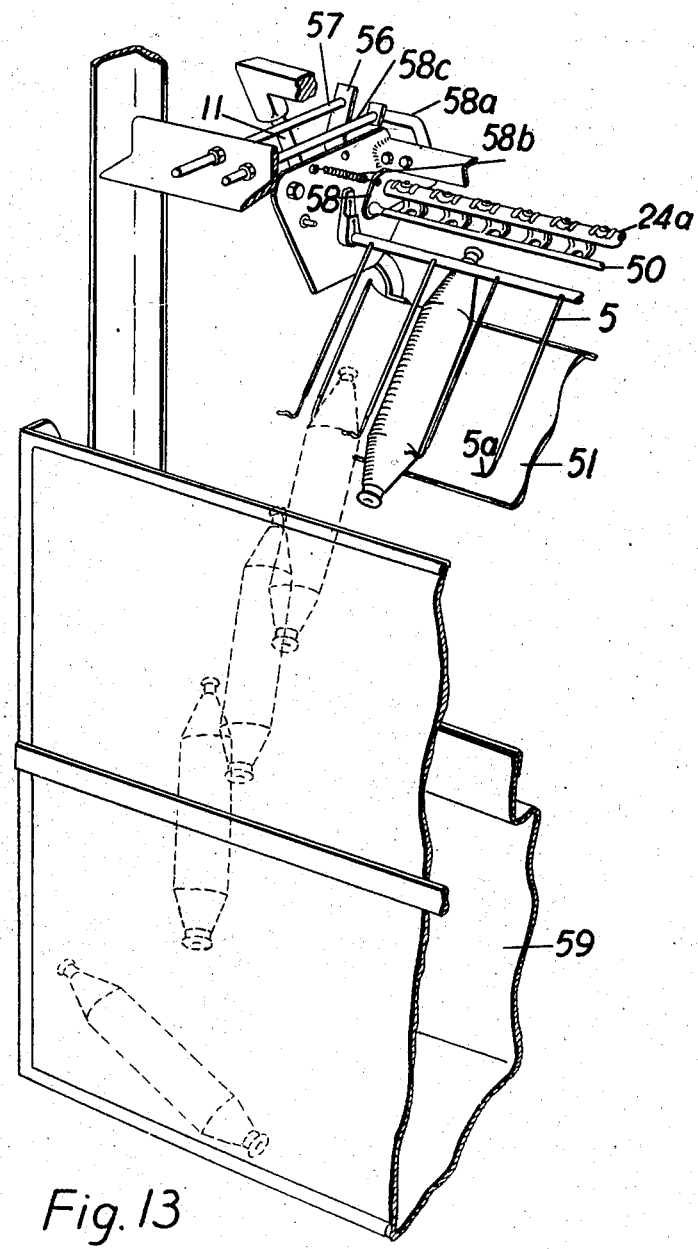
Fig. 13 is a perspective view of the mechanism for releasing and collecting the full bobbins from the lifters.

One method of carrying out the invention is to operate on all the spindles on one side of the spinning frame simultaneously as described later, but another method is to operate upon such spindles in sets. According to such latter method, and as shown in Figs. 8 to 25, one means of carrying out the invention comprises a carriage, traversed along the frame on rails and halted before successive sets of spindles, carrying the various operative members required for carrying out the cycle of operations involved in the process described above. A pair of such carriages right and left hand may be provided each adapted to serve one side of each of a group of frames and operating from the same end with advantages such as reducing the mechanism required. As shown in Figs. 8 and 9 the carriage is adapted to be supported by wheels 9 running on a lower rail 9a supported by brackets 9b from the spindle rail 9c of the spinning frame, and is located in a vertical position by lower guide rollers 9d bearing on the front face of the rail 9a and by upper guide rollers 9e bearing against the rear face of an upper rail 9f supported by brackets 9g also from the spindle rail 9c of the spinning frame. In addition, ground wheels 9h and 9j are provided for transport of the carriage from one frame side to another. Such ground wheels 9h are carried by bell-cranked arms 9k loaded by springs 9m so as to support part of the weight of the carriage when the latter is mounted on the rails of the spinning frame.

The aforesaid operative members may conveniently be regarded as forming three units; (1) a combined lifter and disposal unit concerned with the loosening, raising and disposal of the full bobbins from the spindle and the control of the thread; (2) a combined cutter and traveller drag unit; and (3) an empty-bobbin feed unit. Most of the motions required are produced at the appropriate time by means of cams or fingers mounted on the cam-shaft X which makes one rotation during the cycle of operations. These cams are shown in their relative positions on the shaft X in Fig. 10. It is convenient to specify these cams and fingers here, though they relate to mechanisms not yet fully described. They are:

A for the operation of the hook guide

B for the raising and lowering of the lifter unit
C for rocking the cutters
D for rocking the lifter unit
E for opening and closing the cutters
F for tripping the traveller drags
G for rocking the empty bobbin projectors of the feed unit.
H for tripping the sector catch to project the empty bobbins
J for controlling the position of the sector
K for tripping catches which retain the empty bobbin projectors
N for tripping the latch which locates the carriage.

The lifter unit has end plates 10 (see Fig. 9) slidable on guide rods 11 which can be rocked as hereinafter described. The unit is lifted by crank arms 12 linked to the end plates 10 by connecting rods 13 and attached to a shaft 14 mounted on bearings 14a (Fig. 8) in the carriage framework and carrying a pinion 15 driven by a sector 16 operated by the cam B. In the bottom position of the lifter unit, where the bobbins are loosened on the spindles, the crank arms 12 operate near their dead centre position thus working at a large mechanical advantage. They produce approximate simple harmonic motion on which the cam B superposes modifications required for the cycle of operations. The hooks 5 (Fig. 11) on the shaft 5b are operated by the arm 18 engaging the guide 19 which rocks on the shaft 19a. The hooks are retained by a spring 20 in an outward position from the carriage (i. e. towards the spinning frame) against the guide 19, and when such motion is required are pressed inward by the movement of the guide 19 through the action of a lever 19b connected to the guide 19 and having a roller 19c engaging the cam A. This cam is undercut at $A^1$ so that when such roller 19c enters the undercut, the guide 19 is moved by a spring 19d away from the roller 18d allowing the spring 20 to bring the hook ends 5a into position below the bobbins, as shown in Fig. 1, so that they press against the bare spindles 4, and are thus located with an accuracy difficult to attain by positive movement by the cam. The portion 22 of the cam A, which allows this outward motion of the hooks 5, is adjustable as regards timing. The cam A also contains a portion 23 which is for the purpose, previously referred to, of maintaining the yarn in a state of tension when the bobbins are lowered after having been raised for ensuring the engagement of all the threads by the hooks. This portion 23 is adjustable as regards the amount of motion produced.

At the beginning of the cycle of operations, the lifter unit is in its highest position: and on its downward journey the lifters 24, which are of forked shape (see also Figs. 14 and 15), on the shaft 24a are first rocked outward to avoid the tops of the bobbins, and then after further lowering, are rocked inward so as to engage the shoulders 25 near the tops of the bobbins. These motions are produced by means of a fixed guide 26 (Fig. 12) whose face 26a engages, through a roller 27, a member 28 carried on the lifter unit by means of links 29. This member 28 has sprung to it, by the spring 30, an arm 31 attached to the shaft 24a which carries the lifters 24. A further spring 31a is provided, pulling the arm 31 towards a stop 33 to locate the lifters in their operative position. When the lifter unit reaches its lowest position the roller 27 springs inwards under the end of the guide 26, and the lifters 24 spring under the shoulders 25 of the bobbins.

When the lifters are subsequently raised, the roller 27 travels up the inner face 26b of the guide 26 and the bar 28 is moved out of contact with the arm 31. The guide 26 extends upwards sufficiently for the roller 27 to remain in contact with the face 26b when the bobbins are raised to the highest position attained during the process of thread control. When the carriage is finally raised to its full height the roller 27 leaves the face 26b of the guide 26 and is moved by its spring 30 so that when the lifter unit descends again such roller engages the face 26a.

The guides 11 (Figs. 8 and 9) are joined at the top by a cross bar 52 and are attached rigidly to the brackets 53c which are fixed to the shaft 53, this shaft being carried on bearings 53a. The cross bar 52, the guides 11, the brackets 53c and the shaft 53 thus form a rigid structure and this structure is normally pulled by a spring 53b against stops (not shown) to keep the guides 11 in the vertical operative position as shown in Figure 9. The structure is, when necessary, rocked about the axis of the shaft 53 by means of the cam D operating against the arm 54 fixed to the shaft 53.

This rocking is timed to occur after the lifter unit has been returned to its highest position, and it initiates the operation of the full-bobbin disposal unit. During the previous upward motion of the lifter unit the bobbins are retained in the jaws of the lifters 24 (see Figs. 13 and 14) by the rod 50 which is pivoted on the shaft 24a by means of arms 58, and is held in its operative position (i. e. closing the jaws of the lifters 24) by the spring 58b. One of the arms 58 has an upward extension 58a which, when the guides 11 are rocked, engages a stop 58c so that the rod 50 is moved away from its operative position. A tray 51 is pivoted to the cross bar 52 at 51a and 51b (Fig. 8), and carries an arm 56 which, when the guides 11 are rocked, meets an adjustable rod 57 attached to the carriage. The tray 51 is thus tilted and the bobbins are pushed out of the jaws of the lifters, the tray assuming a position such that the bobbins slide down it and fall into a box 59. Previous to this it is necessary, however, that the hooks 5 should be out of the way of the falling bobbins. To effect this the arm 18 (Fig. 11) has an open slot 18a which engages a stud 18b on the arm 18c fixed to the cross bar 52, this engagement occurring a little before the lifter unit reaches its highest position.

Figure 5A:
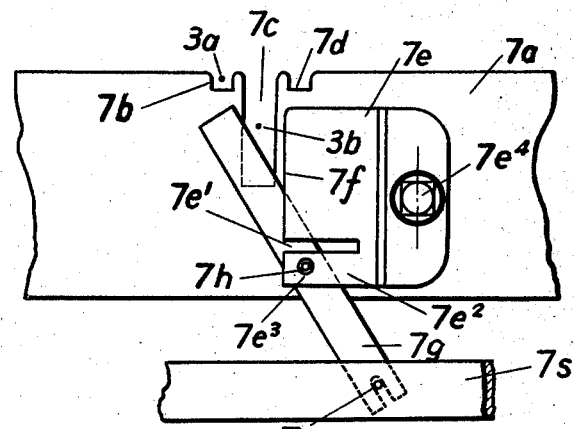
Figs. 5A and 5B are elevation and plan of the means for severing and holding one end of the severed yarn.

The cutter plate 7a (Figs. 16A, 16B, 16C, and 17) is mounted on brackets $7j^1$ and $7k^1$ attached to a tube 7m mounted on a shaft 7n which in turn is mounted in bearings 7p fixed to the carriage (see Fig. 8). The cutter plate 7a with its brackets $7j^1$ and $7k^1$ and the tube 7m form a rigid structure rockable about the shaft 7n by a bowl 7q attached to the bracket $7j^1$ and engaging the edge of a cam C, whose function is to rock the cutter mechanism into and out of its operative position at the appropriate times. The cutter blades 7g are slotted at their lower ends and are each engaged by a pin 7r carried by a bar 7s. The bar 7s is connected to the plate 7a by links 7t and is adapted to be rocked endways by an arm 7u pivoted at 7v to the bracket $7k^1$ and engaging at one end a face-cam E having an adjustable cam-piece $E^1$, and at the other end engaging blocks 7w carried by the bar 7s. A return spring 7x is provided for the bar 7s to maintain the cutters in the open position as shown in Fig. 5A.

Figure 5B:
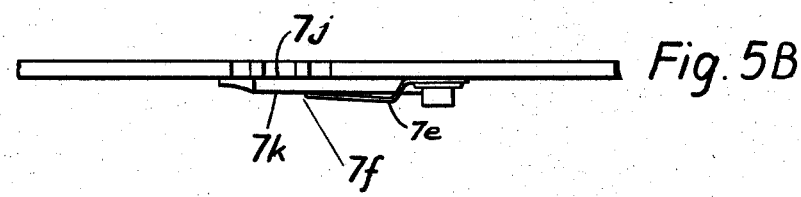

As shown in detail in Figs. 5A, 5B, 6A, 6B and 6C the pivoted cutter blade 7g is so shaped and arranged as to provide a progressively moving point contact with substantially uniform contact pressure. This effect is obtained by forming the fixed spring blade with a notch $7e^1$ to divide the blade into the upper or cutting portion 7e with its cutting edge 7f and a lower portion $7e^2$ which acts as a retaining member for the pivoted cutter blade 7g as described later. Both portions 7e and $7e^2$ are inclined as shown in Fig. 5B and sprung towards the pivoted cutter 7g to provide pressure holding the pivoted cutter resiliently against the metal plate 7a thus providing pressure to grip the end 3b of the thread after cutting. The cutting edge 7k of the pivoted cutter 7g is inclined as shown in Fig. 6B thickening towards the tip so that a substantially uniform pressure is obtained in spite of the greater flexibility of the spring blade 7e towards such tip. As shown also in Fig. 6C the pivoted cutter blade is backed off away from the cutting edge 7k to clear the inclined blade 7e in all positions of the pivoted cutter 7g. The back face of the pivoted cutter 7g is plane and the blunt edge 7j is square to provide a cleaning action against the plate 7a to avoid any possible accumulation of loose fibre or dirt which might hold the pivoted blade away from the plate 7a and prevent holding of the end 3b of the thread. The pivot 7h is fixed rigidly in the plate 7a and the pivoted cutter blade is merely held thereon by the portion $7e^2$ of the spring blade 7e which latter has a locating hole $7e^3$ fitting over such pivot and is adapted to be secured by a single screw $7e^4$ to the plate 7a. Thus by removing the single screw $7e^4$ both the spring blade 7e and the pivoted cutter blade 7g can be removed.

Figure 7:
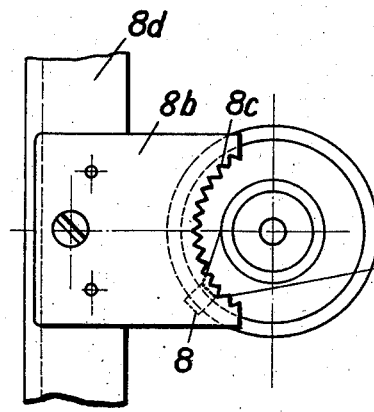
Fig. 7 is a detail plan of means for immobilising the thread during the pick up.

In order to immobilise the thread passing from the traveller 8 to the thread guide or lappet 8a (see Figs. 3 and 7) use is made of a thread immobiliser or "traveller drag" consisting of a plate 8b with arcuate serrated edge 8c one for each spindle; such plates being fixed to a bar 8d (Fig. 17) carried on brackets 8e and 8f mounted on the shaft 7n previously referred to. The operative position of the traveller drags is when the arcuate serrated edges are in the track of the thread and at a level slightly above that of the ring travellers (see Fig. 3) and they are maintained in this position by an arm 8g held against a stop 8h by a spring 8k, both stop and spring being fixed to the carriage. The bar 8d is withdrawn to its inoperative position by a catch 8j carried by the bracket $7k^1$. The bowl 7q on the cutter bracket $7j^1$ is held in contact with the cam C by a spring 7y strong enough to overcome the spring 8k. The catch 8j is adapted to be tripped by the finger F on the cam shaft X.

To feed the empty bobbins on to the spindles use is made of a bobbin-projector in conjunction with a magazine feed system (Figs. 18, 19, and 20). The bobbin projector comprises a double set of V-shaped receivers 61a and 61b fixed to bars 61c and 61d respectively holding respectively the upper and lower ends of the bobbins, the latter being fed from a magazine 60, whose construction and mode of action are hereinafter described. The bar 61c is slidable on two rods 62, being raised when the bobbins are fed into the receivers, and then lowered so that pegs 63 enter the top part of the bore of the bobbins. The base of the bar 61d is perforated with circular holes 64 larger in diameter than the base of the bobbins, and rubber tabs 65 project into these holes in order to prevent the bobbins from falling through the holes. Pieces of metal 66 which serve to retain these tabs are of sufficient thickness to prevent the bobbins from moving horizontally out of the receivers. The complete system consisting of the bars 61c, 61d, the receivers 61a and 61b and the rods 62 is pivoted by means of arms 67a and 67b, attached to a tube 68 on the shaft 14. This system is rocked by means of a cam G operating on a roller 67c on one of the arms 67b from a position where it rests against the magazine 60 to a position vertically above the spindles. A toothed sector 69 rotatable on the shaft 14 is held by a spring 70 with its stop 71a engaging the end of a catch 71 pivoted on the arm 67b. After the bobbin-projector moves into the position over the spindles the finger H attached to the cam shaft X trips the catch 71 thus causing, through the train of gears 73, the toothed wheel 74 to act on the teeth of a rack 62a cut in the rod 62, and thus move the bar 61c downward so that it forces the bobbins downwards overcoming the slight resistance of the tongues 65 whereby the bobbins are projected on to the spindles. The lowering of the upper set of receivers by the spring 70, previously loaded by the outward motion of the projector unit, is checked by a stop 75 preferably made of rubber. The top bar 61c is re-set by restoring the projector unit as a whole to its initial position against the magazine 60 by the action of the springs 67d under the control of the cam G. During the backward motion of the arm 67b, an adjustable cam-bowl 76 on the sector 69 meets the cam J so that relative motion between the arm 67b and sector 69 causes rotation of the train of gears 73 and the gear wheel 74, so as to raise the rod 62 and reset the catch 71.

The bobbins are supplied to the carriage in the magazine 60 which will preferably contain enough bobbins to supply one complete side of the ring frame. This magazine, see Fig. 20, is divided into an even number of vertical compartments 80 spaced at half the spindle gauge, that is to say the number of these compartments will be equal to twice the number of spindles which can be operated upon in a single cycle of operations. The division into compartments is effected by partitions 80a which are riveted to the top, bottom and back of the magazine 60. The partitions are provided with guides 80b which adapt the amount of lateral free space to the taper of the bobbins. Supplementary guides 80c are provided to control accurately the tip of each bobbin as it emerges from its compartment. The bobbins are fed from the magazine by W-shaped springs 80d held against the back of the magazine and constrained between the guides 80b and a set of lower curved guides 80e. The springs act on the bobbins through bobbin-followers 80f which are attached to the front ends of the springs. These bobbin-followers extend the full width of their respective compartments and retain their springs when the compartments are empty by engagement with beaded edges 80g of the partitions 80a, the springs being then under an initial loading. The bobbin-followers 80f are shaped to protrude slightly beyond the front edges of the partitions, so as to ensure the ejection of the last bobbin. The bobbins which have been placed in the magazine through the front apertures of the compartments 80 in echelon formation to ensure regular packing and avoid endways jamming against the top and bottom of the magazine are retained temporarily by means of a rod running through holes 80h near the front of each compartment. When the magazine is placed in position on the carriage this rod is removed and the bobbins are then retained by means of lower and upper shutters 81a and 81b fixed to the framework of the carriage. The method of feeding the bobbins is illustrated diagrammatically in Fig. 21 which represents a sectional plan taken at the level of either the upper or lower receivers. The shutters have openings 81c spaced one spindle gauge apart and situated opposite the receivers 61a and 61b, these openings being sufficiently wide to allow the bobbins to pass into the receivers. The magazine is normally disposed as shown in Fig. 21, so that the bobbins are retained by the shutters. The bobbins are fed by moving the magazine endways, to the right in one cycle and to the left in the next, and so on, thus bringing in successive cycles alternate compartments opposite the openings of the shutters.

Each column of bobbins is pushed forward by its spring 80d as the front bobbin is delivered to the receiver and the shutter is so placed that, as the magazine is moved endways into its normal position, the succeeding bobbin rolls on to the shutter as shown in Fig. 22.

As previously mentioned the bar 61c is normally disposed so that the pegs 63 clear the heads of the bobbins as they are fed into the receivers; and soon after this they are lowered so that the pegs enter the upper part of the bore of the bobbins. During this process there is a tendency for the bobbins to be pushed through the holes 64 in spite of the action of the tongues 65. This is prevented by extension pieces 81d of the bottom of the shutters projecting below the bobbins as shown in Fig. 23. When the projection unit moves as previously described to its position over the spindles the bobbins are retained merely by the tongues 65. When the bobbins are projected on to the spindles, they are pushed past the tongues 65 which do not make contact with the narrower parts of the bobbins, which thus fall unobstructed on to the spindles.

The magazine 60 is placed on a carrier 82 slidable along the carriage on ball-slides 82a and 82b. Endways motion of the magazine relative to the carrier 82 is prevented by lugs 82c attached to the carrier 82. Tilting of the magazine from the tray under the reaction from the magazine springs, when feeding is taking place, is prevented by means of lugs 82d in the magazine gripping underneath the front edge of the carrier. The necessary endways motion of the magazine for feeding is produced by means of the double action face cam M which is mounted on the supplementary shaft Y geared to the cam shaft X so as to rotate at half its speed, movement being transmitted through a rod 82e shown in Fig. 20.

As shown in Fig. 20, a rod 82f is fixed to the tray 82 and has a fixed central boss 82g on each side of which is a spring loaded plunger $82h^1$ with flat ended heads 82h which form resilient sides for engagement by the upper end of the rod 82e. The rod 82e, the loading springs for the plungers being enclosed within the tubular bodies of said plungers, is slidably carried by a block 82j and carries a roller follower 82k engaging the groove of the cam M. In the event of the tray being jammed during the bobbin feed, the spring loaded plungers will yield and prevent damage to the mechanism whilst at the same time providing positive movement of the tray against normal resistance.

During the feeding of the bobbins the projector is retained against the reaction of the magazine springs by means of catches 83 engaging studs 83d. These are released when the projector unit is moved into position over the spindles. The catch 83 is mounted on a shaft 83a which carries an arm 83b retained in the normal position by a spring 83c, and is tripped by a cam K on the cam shaft X. When the projector is returned from its position over the spindles the stud 83d slides up the inclined face of the catch and is caught in the slot 83e of the catch 83.

Having described the nature of the mechanism required for producing the various motions, it becomes necessary to specify more precisely the timing of these. The lifter unit starts from its highest position and descends to its lowest position where the lifters 24 engage the bobbins. The hooks 5 which have been moved out of the way of the falling full bobbins at the end of the previous cycle are returned, during the early part of the descent of the lifter unit, to their normal resting position with the bowl 18d, on the arm 18, in such a position that it will meet the upper portion of the slide 19 as the lifter unit descends. The first action of the slide 19 is to move the hooks 5 clear of the bobbins and it subsequently produces the motion of the hooks 5 previously described, for the purpose of the thread control. During the early part of the descent of the lifter unit the traveller drags 8b move into their operative position and so immobilise those threads which happen to have come to rest with the traveller in the front 120° sector of the ring, so that the portion of thread passing from the traveller to the drafting rollers cannot be brought into a position where it might be trapped by the new bobbin as this is placed on the spindle. A further function of the traveller drag is to prevent the traveller from moving round the ring as the bobbin is raised during the process of thread control thus reducing the amount of coiling round the bare spindle, which would necessitate a greater lift.

During this raising of lifter unit, after which the minimum amount of thread is coiled on the bare spindle to ensure the trapping of the thread by the empty bobbin, the hook 5 is brought by the means previously described to the position shown in Fig. 1 where the hook end 5a rests under the bobbin against the spindle 4. This upward motion of the lifter unit is continued until a further complete turn is unwound from the bobbin, thus ensuring that every thread is caught by its hook. During this raising of the lifter unit the cutters are rocked to their operative position in front of the spindles. The lifter unit is then lowered to put the threads in the slots 7b and 7c of the cutters as previously described. The cutters are then closed, thus severing the thread and freeing the full bobbin. The lifter unit is then raised to its highest position to make room for the projector unit to be rocked into position over the spindles.

During the early stages of the cycle, the magazine is moved endways as previously described to feed the receivers 61a and 61b of the projector from one set of alternate compartments. The magazine is then returned to its neutral position where the remaining bobbins in the magazine are retained by the shutters 81a and 81b. During this return the pegs 63 are lowered to engage the upper part of the bore of the bobbins, after which the projector unit is rocked over the spindles. The bobbins are then projected on to the spindles as previously described, by the descent of the bar 61c. The cutters are then opened releasing the end passing to the coils round the bare spindle, which are trapped against the shoulder of the spindle by the bobbin, thus completing the replacement of the full by the empty bobbins, keeping the thread in a state such that spinning can be resumed after the whole frame has been operated upon.

During the projection of the empty bobbins the lifter unit, loaded with full bobbins, is rocked towards the rear of the magazine; the tray 51 is brought into position, the retaining rod 50 being meanwhile withdrawn, the tray pushing the full bobbins out of the jaws of the lifters 24 and guiding them into the box 59.

It remains to restore the various members to their initial positions. All the necessary motions, as previously described, occur under the action of springs and cams, except for the traveller drag which is picked up by the cutters by means of the catch 8j.

The above description applies to the cycle of operations to be carried out while the carriage is stationary opposite a set of spindles which have to be doffed. To locate the carriage opposite the set of spindles, use is made of the latching system shown in Fig. 24. This consists of upper and lower elements. The upper element consists of a finger 90 pivoted at the end of the arm 90a which is itself attached rigidly to a shaft 90b carried in bearings (not shown) on the carriage. The shaft 90b carries, rigidly attached to it, the forked arm 90d which is flexibly linked to the arm 91d by the spring casing 90f, the spring 90g and central rod 90h. The lower element consists of a horizontal strip 91 with indentation 91a shaped to engage stops 92, spaced according to the number of spindles doffed during each doffing cycle, and carried on the outer face of the upper rail 9f. The element 91 is rigidly attached to a shaft 91b in bearings (not shown) and carries the aforesaid arm 91d.

Figure 24:
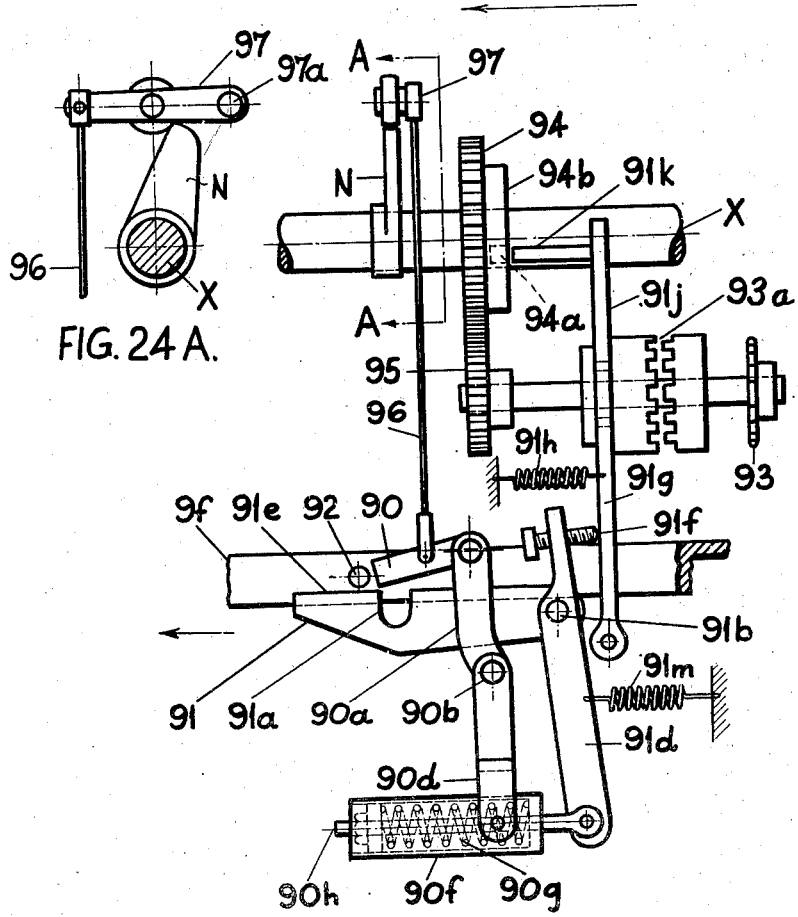
Fig. 24 is a view of the latching system and the single revolution mechanism on the cam shaft.

As the carriage, moving in the direction indicated by the arrow in Fig. 24, approaches one of the stops 92 the latch member 90 engages it and attempts to lift the member 91 upwards against the stop 92 so that the portion 91e of the upper edge of the member 91 makes contact with the stop 92. Further motion of the carriage loads the spring 90g which pulls the member 91 so that the indentation 91a engages the stop 92 and so accurately locates the carriage. The movement of the element 91 may be used to clutch in a motor to drive the cam shaft X as illustrated in Fig. 24. The arm 91d has an upward extension which engages through an adjustable set screw 91f the arm 91g, pivoted in bearings (not shown) operating the clutch 93a, which is normally held out of engagement with the driving sprocket 93 by the spring 91h, one end of which is attached to the arm 91g and the other to the carriage framework. The clutch arm 91g has an extension 91j which carries a finger 91k which at the beginning of the cycle rests in the hole 94a in the rim of the gear wheel 94 fixed to the cam shaft X, the clutch being therefore disengaged. The drive is normally transmitted by means of the sprocket 93 through the clutch 93a to the gear wheel 94 through the pinion 95. When the member 91 engages the stop 92 the resultant motion of the arm 91d engages the clutch through the arm 91g and at the same time removes the finger 91k from the hole in the rim of the wheel 94 thus permitting the cam shaft to rotate. Once the cycle has started the arm 91j is held by the rim of the gear wheel 94b so that the clutch is maintained in the engaged position. Near the end of the cycle after the empty bobbins have been projected on to the spindles and precise location of the carriage is no longer required, the latch member 90 is raised by means of a rod 96 on an arm 97 pivoted to the carriage framework at 97a and tripped and subsequently released by the finger N fixed to the cam shaft X. This releases the energy stored in the spring 90g so that the latch members 90 and 91 are restored to their original positions, this restoration being assisted by the spring 91m attached at one end to the member 91d and at the other to the carriage framework.

At the end of the cycle of operations, when the cam shaft X has made one complete revolution, the finger 91k falls into the hole 94a under the action of the spring 91h and so de-clutches the drive.

The driving of the sprocket 93 is by means of a motor 102 (see Fig. 8) carried on the carriage framework, the current being supplied by a trailing cable wound on a drum 103 of known type, carried on the carriage framework.

The carriage may be traversed by hand from one position to the next, the latch being engaged and disengaged automatically by the mechanism described above. If it is desired, after a complete side of the ring frame has been doffed, to return the carriage backwards along its path, as would normally be the case, this may be done since during such motion the stops 92 pass under the member 90 and raise it without disturbing the arm 90a.

We declare that what we claim is:

1. The method of doffing for ring spinning, doubling and twisting frames which consists in lifting the bobbin thereby to unwind some of the yarn thereon over the lower end of the bobbin on to the spindle, catching and picking up the yarn as it so unwinds and thereby limiting the amount of yarn which winds on to the spindle whereby said yarn is readily pulled away with the full bobbin at the succeeding doffing, gripping and severing the picked up portion of the yarn in such a way as to hold the end leading to the spindle and thence to the traveller and release the end leading to the bobbin.

2. The method of doffing according to claim 1, including the further steps of removing the full bobbin and fitting an empty bobbin on to the spindle so as to trap the yarn wound thereon, the yarn between the spindle and the traveller being then intact so that spinning or doubling can be resumed.

3. The method according to claim 1 and including the further step of immobilising the yarn leading to the traveller from the source of supply preceding the initial step of lifting the bobbin and so as to preclude movement within a certain arc of the ring.

4. The method of doffing for ring spinning, doubling and twisting frames which consists in lifting the bobbin thereby to unwind some of the yarn thereon over the lower end of the bobbin on to the spindle, catching and picking up the yarn as it so unwinds and thereby limiting the amount of yarn which winds on to the spindle whereby said yarn is readily pulled away with the full bobbin at the succeeding doffing, partly lowering the bobbin thereby to provide slack in the thread between the bobbin and the spindle and simultaneously drawing such slack into a loop away from the spindle and presenting the loop for gripping and severing the picked up portion of the yarn so as to hold the end leading to the spindle and thence to the traveller and release the end leading to the bobbin, and removing the full bobbin and placing an empty bobbin on the spindle thereby to trap the yarn wound thereon, the yarn between the spindle and the traveller being intact so that spinning or doubling can be resumed.

5. In a doffing apparatus for ring spinning, doubling and twisting frames, means for engaging and raising the full bobbin with the result that some of the yarn thereon unwinds over the lower end of the bobbin on to the spindle, means for catching or picking up the yarn below the bobbin as it so unwinds, and thereby limiting the amount of yarn which winds onto the spindle so that this yarn is readily pulled away with the full bobbin at the succeeding doffing, means for gripping and severing picked up portion of the yarn in such a way as to hold the end leading to the spindle and thence to the traveller and release the end leading to the bobbin.

6. Apparatus according to claim 5 including means for removing the full bobbin and fitting an empty bobbin on to the spindle so as to trap the yarn wound thereon, the yarn between the spindle and the traveller being then intact so that spinning or doubling can be resumed.

7. Apparatus according to claim 5 including means for preventing the traveller from passing in front of the spindle during doffing, said means comprising a serrated sector and means for moving said sector into the path of possible rotation of that portion of the thread leading from the source of supply to the traveller.

8. In a doffing apparatus as set forth in claim 5, the means for engaging and raising the full bobbin comprising a forked member adapted to engage a shoulder at the upper end of the bobbin and means for retaining the bobbin in the forked member during the lifting operation while still permitting the bobbin to rotate.

9. In a doffing apparatus as set forth in claim 5, the said bobbin raising means operating with high initial advantage and comprising a crank, a connecting rod and a cam for operating said crank, which latter is initially near dead center.

10. In a doffing apparatus as set forth in claim 5, raising mechanism for the bobbin comprising a cam, shaped so as to introduce, following the initial raising of the bobbin, an intermediate stage of lowering and re-raising the bobbin.

11. In a doffing apparatus according to claim 5 characterised in that the means for catching the yarn comprises a hook and means for moving the same into position beneath the bobbin so as to lie in the path of yarn winding off the bottom of the bobbin on to the spindle as the bobbin is raised.

12. In a doffing apparatus as set forth in claim 5, the means for catching the yarn comprising a hook and means for moving the same into position beneath the bobbin so as to lie in the path of yarn winding off the bottom of the bobbin on to the spindle as the bobbin is raised, and further characterised by means for moving the hook downwards and away from the bobbin to form an open loop for further mechanical manipulation of the yarn.

13. In a doffing apparatus as set forth in claim 5, raising mechanism for the bobbin comprising a cam, shaped so as to introduce, following the initial raising of the bobbin, an intermediate stage of lowering and re-raising the bobbin, the means for catching and picking up the thread comprising a hook, means for moving the hook away from the spindle after catching and picking up the yarn and simultaneously with the intermediate stage of lowering of the bobbin so as to bring the yarn into operative relation with the gripping and severing means.

14. In a doffing apparatus as set forth in claim 5, characterized in that the means for severing the yarn between the base of the bobbin and its spindle comprises a cutter adapted to grip the portion of the yarn leading to the spindle and sever the portion leading to the bobbin and further characterised in that the cutter comprises a fixed back plate having a pair of indentations adapted to receive and separate the arms of an open loop of yarn, a cutter blade movable across one of the indentations and resiliently urged against the same and having a front cutting edge, a blunt rear edge and back face, the latter being adapted to grip the yarn against the said fixed back plate and a cutter plate having a cutting edge engaging and complementary to the front cutting edge of the cutter blade in scissor-like action for severing the portion of the yarn leading to the bobbin.

15. In a doffer apparatus as set forth in claim 5, embodying means for delivering a plurality of bobbins simultaneously to a multiple receiver comprising a magazine, a combined bobbin receiver and projector adapted to receive bobbins from the magazine, means for delivering bobbins from the magazine to the receiver, means for moving the receiver into position over the bobbin spindle and means for projecting the bobbin from the receiver on to the spindle, further characterised in that the magazine has compartments for holding bobbins spaced at half spindle gauge and means for moving the magazine relative to the shutters into alternative positions so as to deliver one bobbin simultaneously from either set of compartments at spindle gauge.

GEORGE ALFRED REA FOSTER.
JAMES GREGORY.

REFERENCES CITED

The following references are of record in the file of this patent:

UNITED STATES PATENTS

| Number | Name | Date |
|---|---|---|
| 745,466 | Tichon et al. | Dec. 1, 1903 |
| 983,858 | Colman et al. | Feb. 7, 1911 |
| 1,142,011 | Boozer, Jr. et al. | June 8, 1915 |
| 1,572,103 | Buchanan | Feb. 9, 1926 |
| 1,669,769 | Miller | May 15, 1928 |
| 1,795,300 | Evcichjevitz | Mar. 10, 1931 |